H. B. EVEREST & A. P. ROSS,

C. E. Ross, Executrix of A. P. Ross, dec'd, assignors to VACUUM OIL COMPANY.

Transportation Can and Box for Oil.

No. 9,017. Reissued Jan. 6, 1880.

Witnesses
Henry Howson Jr
Harry Smith

Inventors
Hiram B. Everest
and
Austin P. Ross
by their Attorneys
Howson and Son

N. PETERS, PHOTO-LITHOGRAPHER, WASHINGTON, D. C.

UNITED STATES PATENT OFFICE.

HIRAM B. EVEREST AND CAROLINE E. ROSS, (EXECUTRIX OF AUSTIN P. ROSS, DECEASED,) OF ROCHESTER, NEW YORK, ASSIGNORS TO VACUUM OIL COMPANY, OF SAME PLACE.

TRANSPORTATION CAN AND BOX FOR OIL.

SPECIFICATION forming part of Reissued Letters Patent No. 9,017, dated January 6, 1880.

Original No. 132,955, dated November 12, 1872; Reissue No. 8,225, dated May 14, 1878. Application for Reissue filed December 4, 1879.

*To all whom it may concern:*

Be it known that HIRAM B. EVEREST and AUSTIN P. ROSS, both of the city of Rochester, county of Monroe, and State of New York, did invent a certain Improvement in Transportation Cans and Boxes for Oils and other Liquids, of which the following is a specification.

This invention consists in providing a box for incasing an oil-can or other vessel for liquids with arms or strips attached to one portion of said box, whereby said portion, with the arms or strips, may serve as a frame in which the can or vessel may be elevated, and so supported upon pins or pivots as to be freely swung for the purpose of pouring out its contents.

Figure 1:
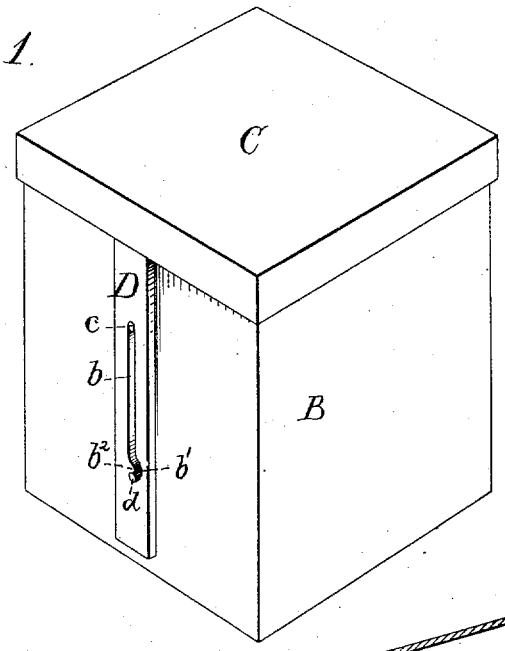
Figure 3:
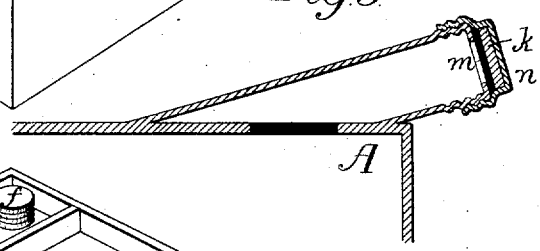
Figure 2:
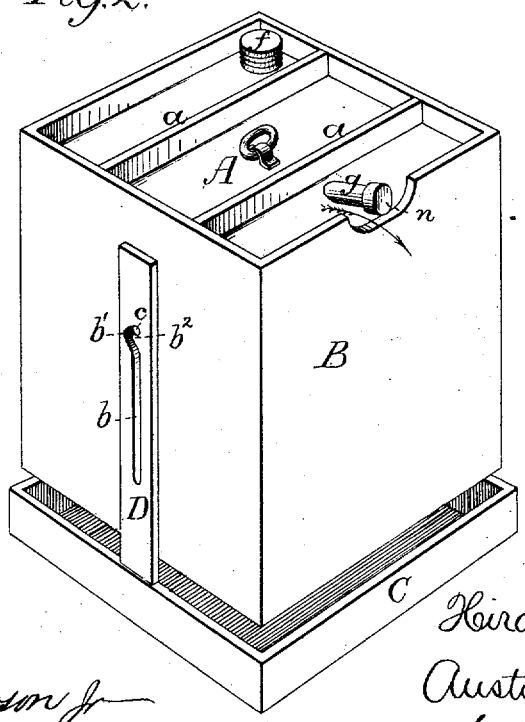

In the drawings, Figure 1 is a perspective view of the package as secured for transportation or storage. Fig. 2 is a view of the same in position for pouring the contents from the can. Fig. 3 is an enlarged sectional view of the nozzle, showing its connection with the can.

In handling or conveying oils, spirits, acids, &c., it has been customary to incase the cans or receptacles in wood boxes, which are secured by nailing or otherwise. Such packages answer the purpose of a cover or envelope only.

The present invention is an improvement on this plan, inasmuch as a portion of the casing, with its arms or strips, serves the additional purpose of a support upon which the can may be swung to facilitate the pouring out of its contents.

A represents an oil-can or other receptacle, fitted closely within the box B, and secured, if necessary, by one or more cross-cleats, *a*, which prevent any end movement. The box is fitted with a cover or lid, C, which has arms D D on two opposite sides. These arms are of suitable length, and in them are cut slots *b b*, through which pass screws or rivets *c c*, attached to the sides of the box. Near the lower end the slots are curved, as shown at $b'$ $b'$, and at the extremity are offsets $b^2$ $b^2$, in which the screws *c c* engage when the cover is reversed, as shown in Fig. 2, thus forming bearings for the box-pivots. Instead of these arms and slots any analogous means may be used for accomplishing the same effect, which is simply to allow the cover to be raised from the box and turned around under it, to form a support in which the box may turn or swing.

When closed for transportation or storage, as in Fig. 1, the cover fits down closely over the top of the box, and is secured thereto by means of screws *d d*, which may be either inserted through the offset-bearings $b^2$ $b^2$ of the slots or through the arms at any other point, or they may be inserted through the cover itself into the box.

When adjusted for pouring the liquid, as in Fig. 2, the screws *c c*, resting in the offset-bearings $b^2$ $b^2$, simply support the box in an elevated position, so that it swings upon the screws as an axis, and in turning forward, as indicated by the arrow, the liquid can be discharged from the nozzle without removing the can.

This arrangement, as described, gives an additional function to the inclosing-box, and renders it a convenient device for ordinary uses, as well as a cover for the safe transportation of oils and other liquids.

The usual cap or cover *f* is made to the can or receptacle, and in addition to this a discharge-nozzle, *g*, is employed, which stands at an incline in the direction of movement of the box in turning, so as to pour the contents in the proper direction.

The cap *f* and cap *n* of the discharge-nozzle are threaded, and screw upon their nipples in the usual manner. A packing, *k*, of cork or equivalent material, with an outer disk, *m*, of tin-foil or rubber, within the cap, bears against the end of the nipple, thereby making a close joint and preventing leakage or evaporation.

We do not claim a crane or apparatus for elevating and pouring boxed liquids which is separate and detached from the box; but

We claim—

1. A box for incasing an oil-can or other vessel for liquids, said box being provided with arms or strips attached to one portion of the same, whereby the said portion with the arms or strips may serve as a frame in which the can or vessel may be elevated and so supported upon pins or pivots as to be freely swung for the purpose of pouring out its contents, substantially as set forth.

2. The combination of the portion B of the box, having pivot-pins *c*, with the portion C of the box, having standards D D, which serve as bearings or supports for the pivots in swinging the portion B of the box and its contents, as set forth.

3. The combination of the portion B of the box, having pins *c*, with the portion C of the box, having standards D D, which serve as a means of connecting the portions of the box together, and also as bearings for the pivots *c*, as specified.

In testimony whereof we have signed our names to this specification in the presence of two subscribing witnesses.

HIRAM B. EVEREST.
CAROLINE E. ROSS, *Executrix.*

Witnesses:
FRED. P. WILCOX,
MINNIE DE WITT.